Oct. 11, 1966  W. BERNSTEIN  3,278,768
THERMIONIC ENERGY CONVERTER

Filed June 1, 1961  2 Sheets-Sheet 1

INVENTOR
WILLIAM BERNSTEIN,
BY
John M. Koch
ATTORNEY.

INVENTOR.
WILLIAM BERNSTEIN,
BY John M. Koch
ATTORNEY.

United States Patent Office 3,278,768
Patented Oct. 11, 1966

3,278,768
THERMIONIC ENERGY CONVERTER
William Bernstein, Tarzana, Calif., assignor to Hughes Aircraft Company, Culver City, Calif., a corporation of Delaware
Filed June 1, 1961, Ser. No. 114,128
6 Claims. (Cl. 310—4)

This invention relates to a device for the direct conversion of heat energy into electrical energy by thermionic emission of electrons at a cathode, and their collection at an anode. In particular, this invention relates to a thermionic energy converter employing an auxiliary discharge cathode and an ionizable interelectrode atmosphere to provide a plasma in the interelectrode space designed to eliminate the effects of an electron space charge and permit efficient operation at relatively low temperatures.

One type of prior art thermionic energy converter employs a vacuum diode arrangement. Here the effects of the electron space charge are usually reduced by the use of extremely small cathode-anode spacings. These vacuum diode converters are, in general, low temperature devices. However, at the smallest practical spacings, the efficiency and power output density of the vacuum diode converters are of a low order of magnitude.

Another type of device has been described in which the electron space charge is neutralized by positive ions produced as a result of contact ionization of cesium vapor at the cathode. Since the efficiency of contact ionization falls off rapidly with decreasing cathode work function, these devices require relatively high cathode work functions and relatively high cathode temperatures, e.g., above 1800° C. for reasonable interelectrode spacings. In addition to the requirement of relatively high operating temperatures, these prior art devices involve the difficult problem of containment of cesium vapor at high pressures and high temperatures. The extremely corrosive nature of cesium characterizes these devices as having an undesirably short service life for many potential types of commercial applications of thermionic energy converters. Anode work functions less than 1.6 e.v. are not possible in the cesium environments required for these converters.

Accordingly, it is an important object of this invention to provide a thermionic energy converter which will operate at cathode temperatures of about 1200° to 1400° C. with an efficiency of about 25 percent and a power output density of about 10 watts/cm.² of cathode surface area, to be useful with a solar, combustion, fission or radioisotope heat source.

It is another object of this invention to provide such a thermionic energy converter having a long service life, in excess of about 1000 hours, having a stable geometry, and capable of being easily fabricated.

Additional objects of this invention will become apparent from the following description, which is given primarily for purposes of illustration and not limitation.

Stated in general terms, the objects of this invention are attained by providing a thermionic energy converter including a cathode having a work function of about 2.5 e.v. at a relatively low temperature, such as about 1200° C., an anode having a relatively lower work function, such as about 1.0 e.v. at a low temperature, such as about 200° C., an auxiliary cathode or electron emitter positioned between the main cathode and the anode for emitting electrons in a gaseous atmosphere of inert gas, and an envelope enclosing the gaseous atmosphere, the main cathode, the anode and the auxiliary cathode. The auxiliary cathode emits electrons which pass through the gaseous atmosphere with sufficient energy to ionize the gas and provide a plasma in the interelectrode space. Cathode and anode work functions can thus be selected to permit for optimum operation at any desired temperature, including low temperatures.

A more detailed description of this invention is given with reference to the accompanying drawing wherein.

Figure 1:
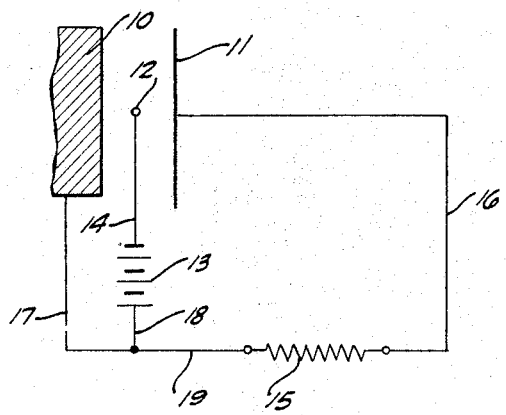
FIG. 1 is a schematic diagram showing the arrangement of the main cathode, the anode, the auxiliary cathode and an interconnecting circuit.

The device shown schematically in FIG. 1 includes a main cathode 10 heated to about 1400° C. by a suitable heating means (not shown) to thermally generate electrons. The anode 11 is spaced about 3 mm. from main cathode 10 and has a temperature of about 200° C. and a lower work function than that of the cathode. An auxiliary cathode, or electron emitter wire 12, is positioned about midway between main cathode 10 and anode 11. Main cathode 10, anode 11 and auxiliary cathode 12 are sealed within an envelope (not shown) in an atmosphere consisting of an inert gas such as argon, xenon, etc., a vapor such as mercury vapor, or a mixture of gases exhibiting the Penning effect. An atmosphere exhibiting the Penning effect is, for example, a mixture of 99.9 percent neon and 0.1 percent argon, or 99.9 percent argon and 0.1 percent mercury vapor. The Penning effect is observed in a gaseous mixture containing a minor portion of a gas having an ionization potential lower than the metastable energy level of the major portion of the gaseous mixture. Emitted primary electrons first excite the metastable level of particles of the main gas, and the probability of ionization of particles of the secondary gas by collision of excited main gas particles with secondary gas particles is relatively high. Thus a relatively high ionization efficiency can be obtained at a relatively low voltage with such a gaseous mixture. This is known as the Penning effect. It can be illustrated in acordance with the following equation:

$$A^* + B \rightarrow A + B^+ + e$$

where A* represents an excited metastable particle of the main gas, B represents a particle of the secondary gas, A represents an unexcited particle of the main gas, B+ represents an ion of the secondary gas, and e represents an electron.

At 1400° C. the work function of cathode 10 is about 2.5 e.v., and that of anode 11 is about 1.0 e.v. The auxiliary discharge current is about 80 ma./cm. length for the argon atmosphere at a voltage of about 20 volts, produced by voltage source 13 connected to auxiliary cathode 12 by conductor 14. A stream of electrons is emitted from auxiliary cathode 12, and accelerated to energies sufficient to produce impact ionization in the interelectrode atmosphere and produce a plasma. The ionization efficiency is about 0.5 ion per primary electron, the plasma density is about $5 \times 10^{12}$/cm.³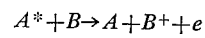, corresponding to a fractional ionization of $2 \times 10^{-4}$, and the total resistive loss is about 0.4 volt. The converter power output is about 9 watts/cm.², at an efficiency of about 25 percent, and only about 15 percent of the power is lost in the generation of the plasma.

Anode 11 is connected to load 15 by conductor 16, and main cathode 10 and voltage source 13 also are connected to load 15 by conductors 17, 18 and 19, as shown in FIG. 1, to complete the converter circuit.

Figure 2:
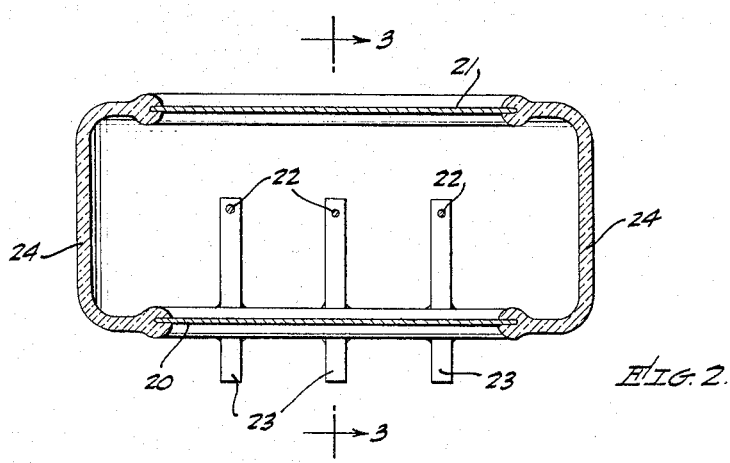
FIG. 2 is a cross-sectional, side-elevational view, drawn to a greatly enlarged scale, showing a planar arrangement of the main cathode, anode and auxiliary cathode in a thermionic energy converter.
Figure 3:
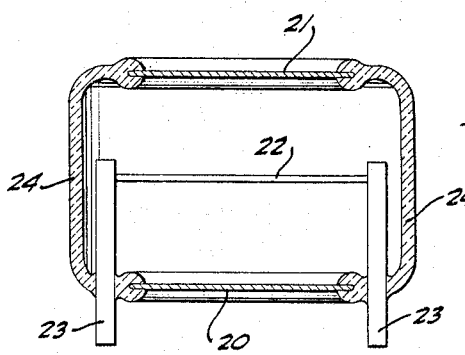
FIG. 3 is a similar view taken along line 3—3 of FIG. 2.

A thermionic energy converter according to the invention is shown in FIGS. 2 and 3. The planar arrangement of the elements of this embodiment is advantageous for use with a solar heat source. A flat main cathode 20 is spaced 2 millimeters from a similarly dimensioned flat anode 21. The auxiliary cathode, or electron emitter, consists of three wires 22, of 10 mil diameter, positioned in a plane midway between main cathode 20 and anode 21. The auxiliary cathode wires 22 are mounted on metallic filament feedthroughs 23, sealed in ceramic walls 24, which are in turn sealed to the edges of main cathode 20 and anode 21, to seal in the interelectrode atmosphere of the converter. The circuit employed with the converter shown in FIGS. 2 and 3 is similar to that shown in FIG. 1.

Because of the magnetic field associated with large currents, the diodes 20 and 21 are limited to surface areas of about 10 cm.$^2$. The cathode 20 is made of a material having a work function of about 2.5 e.v., capable of emitting current densities of about 10 amp./cm.$^2$ at 1300° C. for long periods of time of the order of one or two thousand hours. Among satisfactory materials for the cathode 20 is lanthanum boride deposited on tungsten carbide or on tantalum carbide. The anode 21 is made of a suitable material having a work function of about 1.0 e.v. under the selected operating conditions. Among such suitable materials is cesiated cesium oxide on silver, copper or a refractory metal. Thoriated tungsten is a suitable material for auxiliary cathode wires 22. These wires are connected in parallel, through filament feedthroughs 23, to an independent electrical heating supply (not shown) and are biased negatively from an external voltage supply with respect to the main cathode 20 and anode 21.

In operation, heat is produced by radiation from the hot cathode and the heating power supply (not shown). When the auxiliary cathode wires 22 are heated to a temperature sufficient for copious electron emission, the emitted electrons are accelerated by the applied voltage and produce ionization in the interelectrode gaseous atmosphere. As the charged particle density increases, a positive ion sheath, about 0.2 mm. inch thickness for an argon atmosphere at a plasma density of $10^{12}$/cm.$^3$, forms around each wire 22. The remaining region is field-free. Since the entire applied voltage appears across the sheath, the electrons emitted from the wires 22 are accelerated through the sheath, practically without collision, and enter the plasma region as a substantially monoenergetic stream. With an atmosphere consisting of one of the gases or vapors described hereinabove, at a pressure of 1 mm. mercury, the ionization efficiency, while employing the geometry described in connection with FIGS. 2 and 3, is close to unity. Those positive ions which randomly strike the positive ion sheath boundary are accelerated into a wire 22. Since the maximum accelerating voltages employed are less than 20 volts for all of the gases discussed hereinabove, sputtering of wires 22 as a result of the random ion bombardment of the wires is not a problem. By properly selecting the material of wires 22, heating of the wires by radiation from the hot main cathode 20, by conduction from the heat source, and by the random ion bombardment of the wires can be made substantially sufficient to maintain the desired electron emission, once the converter has been started up and brought to the desired state. However, in practice a small amount of auxiliary heating is desirable since the wire emission current then can be controlled at a constant value despite fluctuations in the temperature and the radiated energy of the main cathode 20.

In a converter unit of the type described above with reference to FIGS. 2 and 3, while employing an argon atmosphere at 900 microns, a current of 2.2 amp./cm.$^2$, the maximum available from the emitter used, was conducted by the plasma produced by an auxiliary cathode wire emission current of about 16 ma. at a voltage of 20 volts. If a xenon or an argon-mercury atmosphere is used in the converter unit, this 2.2 amp./cm.$^2$ current is expected to be neutralized by a discharge current of about 8 ma. at about 12 volts, a large gain in efficiency.

A converter unit of the type shown in FIGS. 2 and 3 readily lends itself to the production of alternating current at any desired frequency as high as about 10 kilocycles. In a converter operating at about 30 percent efficiency with only a half-time duty cycle, the resulting efficiency is about 22 percent, since cooling of the cathode, as a result of electron emission, does not occur during the off-cycle. The discharge can be turned on and off by pulsing the accelerating voltage at the desired frequency. A major advantage in this type of operation resides in the fact that the auxiliary heating power supply need not be a high current supply, and simple pulsing techniques are readily available.

Thus, given a main cathode of 2.5 e.v. work function and an anode of 1.0 e.v. work function, current output densities of 10 amp./cm.$^2$ and output voltages of 1.2 volts are feasible at a power consumption in an argon interelectrode atmosphere of about 80 ma. at 20 volts, or a loss of 15 percent of the power output. When using a xenon atmosphere, or a 99.9 percent argon-0.1 percent mercury atmosphere, the power consumption in the plasma production is reduced to about 4 percent. Operation at 1300° to 1400° C. is thus efficient.

Figure 4:
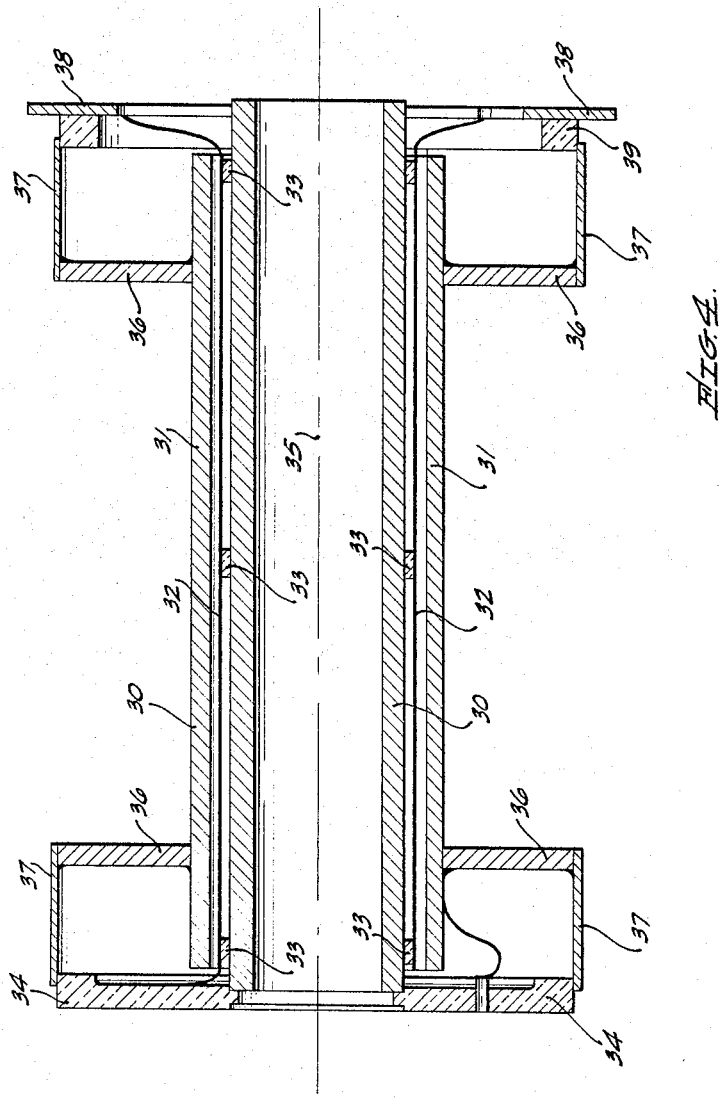
FIG. 4 is a longitudinal sectional view of a cylindrical arrangement of a thermionic energy converter employing a cylindrical anode, auxiliary cathode wires concentrically spaced from the anode and circumferentially spaced from each other, arranged cylindrically inside the anode, and a cylindrical main cathode mounted concentrically inwardly of the anode and spaced auxiliary cathode wires.

Another thermionic energy converter, according to the invention, is shown in FIG. 4. A cylindrical arrangement of the main cathode 30, anode 31 and auxiliary cathodes, or electron emitter wires 32, is employed. This arrangement is advantageous for use with a chemical or combustion heat source. The cylindrical main cathode 30, having an outside diameter of 1 cm. and a length of 5 cm., is provided with three spaced circumferential ceramic support rings 33 and at each end with a ceramic support ring 34. Auxiliary cathode wires 32 are mounted on support rings 33 in spaced parallel arrangement with respect to each other and with respect to the central axis 35 of main cathode 30. Cylindrical anode 31 is mounted concentrically around main cathode 30 and around auxiliary cathode 32 so that a cylindrical space of about 0.1 cm. is established between the outside surface of cathode 30 and the inside surface of anode 31. Auxiliary cathode wires 32 are positioned about midway between these two surfaces, as shown. A circular collar 36, provided with a cylindrical section 37, is mounted concentrically near each end of anode 31, as shown. At each end of the resulting structure is mounted a metal ring 38, flat against ceramic ring 34, and a ceramic ring 39, flat against metal ring 38 and fitted snugly inside the lip of cylindrical section 37. The structure formed by collar 36, section 37 and ring 34 serves to seal the gaseous atmosphere and enclose it in the cylindrical space between the main cathode 30 and the anode 31. The heating source or means is passed through or placed inside main cathode cylinder 30. An electrical circuit, similar to that shown in FIG. 1, is employed with the converter of FIG. 4.

A plurality of converters of the types shown in FIGS. 2, 3 and 4 can be used by connecting them in series, in parallel or in series-parallel as desired.

Obviously, many other modifications and variations of the present invention are possible in the light of the teachings given hereinabove. It is, therefore, to be understood that within the scope of the appended claims the invention can be practiced otherwise than as specifically described.

What is claimed is:

1. A thermionic energy converter comprising a main cathode, an anode positioned in spaced relationship with respect to the main cathode, an inert gas atmosphere in the space between the main cathode and the anode, an auxiliary cathode cooperatively associated with the main cathode and the anode and voltage means connected to the auxiliary cathode for emitting electrons from the auxiliary cathode with sufficient energy to ionize the inert gas by impact ionization and provide a plasma in the space between the main cathode and the anode.

2. A thermionic energy converter comprising a main cathode having a work function of at least several electron volts at elevated temperatures, an anode having a work function less than that of the main cathode positioned in spaced relationship with respect to the main cathode, an ionizable inert gaseous atmosphere at reduced pressure in the space between the main cathode and the anode, an auxiliary cathode positioned between the main cathode and the anode for emitting electrons in the gaseous atmosphere to form a plasma, voltage means connected to the auxiliary cathode for emitting a stream of electrons from the auxiliary cathode with sufficient energy to form said plasma by impact ionization in said inert gaseous atmosphere, and an envelope enclosing the gaseous atmosphere in the space between the main cathode and the anode.

3. A thermionic energy converter comprising a main cathode having a work function of at least several electron volts at an elevated temperature, an anode having a work function less than that of the main cathode positioned in spaced relationship with respect to the main cathode, a gaseous atmosphere at reduced pressure in the space between the main cathode and the anode comprising a minor amount of inert gas having an ionization potential lower than the metastable energy level of the major portion of the gaseous atmosphere, an auxiliary cathode positioned between the main cathode and the anode for emitting electrons in the gaseous atmosphere to form a plasma, voltage means connected to the auxiliary cathode for emitting a stream of electrons from the auxiliary cathode with sufficient energy to form said plasma by impact ionization in said gaseous atmosphere, and an envelope enclosing the gaseous atmosphere in the space between the main cathode and the anode.

4. A thermionic energy converter comprising a main cathode having a work function of about 2.5 e.v. at about 1200° C., an anode having a work function of about 1.0 e.v. at about 200° C. positioned in spaced relationship with the main cathode, a gaseous atmosphere at a reduced pressure comprising a minor amount of a pure inert gas, having an ionization potential lower than the metastable energy level of the major portion of the gaseous atmosphere, an auxiliary cathode positioned between the main cathode and the anode for emitting electrons in the gaseous atmosphere to form a plasma, voltage means connected to the auxiliary cathode for emitting a stream of electrons from the auxiliary cathode with sufficient energy to form said plasma by impact ionization in said gaseous atmosphere, and an envelope enclosing the gaseous atmosphere in the space between the main cathode and the anode.

5. A thermionic energy converter comprising a main cathode having a continuous surface structure, an anode having a continuous surface structure positioned in spaced relationship with respect to the continuous surface structure of the main cathode, an ionizable inert gaseous atmosphere at reduced pressure in the space between the main cathode and the anode, a plurality of auxiliary cathode wires positioned in a plane between the main cathode and the anode and in spaced relationship with respect to each other for emitting electrons in the gaseous atmosphere to form a plasma, voltage means connected to the auxiliary cathode for emitting a stream of electrons from the auxiliary cathode with sufficient energy to form said plasma by impact ionization in said inert gaseous atmosphere, and an envelope of electrical insulating material enclosing the gaseous atmosphere in the space between the main cathode and the anode.

6. A thermionic energy converter comprising a main cathode having a cylindrical surface, an anode having a cylindrical surface in concentrically spaced relationship with respect to the cylindrical surface of the main cathode, an ionizable inert gaseous atmosphere at reduced pressure in the space between the main cathode and the anode, a plurality of auxiliary cathode wires positioned in the space between the main cathode and the anode and in spaced relationship with respect to each other for emitting electrons in the gaseous atmosphere to form a plasma, voltage means connected to the auxiliary cathode wires for emitting streams of electrons from the auxiliary cathode wires with sufficient energy to form said plasma by impact ionization in said ionizable gaseous atmosphere, and sealing means for enclosing the gaseous atmosphere in the space between the main cathode and the anode.

References Cited by the Examiner

UNITED STATES PATENTS

| 2,510,397 | 6/1950 | Hansell | 310—4 |
| 2,881,384 | 4/1959 | Durant | 310—4 X |
| 3,021,472 | 2/1962 | Hernqvist | 310—4 X |

FOREIGN PATENTS 797,872  7/1958  Great Britain.

OTHER REFERENCES

Publication, The Plasmatron by Johnson and Webster, Proceedings of the I.R.E., June 1952, pages 645 to 647.

MILTON O. HIRSHFIELD, *Primary Examiner*.

DAVID X. SLINEY, *Examiner*.